United States Patent
Huang et al.

(10) Patent No.: US 7,218,073 B2
(45) Date of Patent: May 15, 2007

(54) FAN MOTOR SPEED CONTROL CIRCUIT

(75) Inventors: Wen-shi Huang, Taoyuan County (TW); Ming-shi Tsai, Taoyuan County (TW); Cheng-chieh Liu, Taichung County (TW); Tsung-jung Hsieh, Taipei County (TW); Yuch-lung Huang, Miaoli County (TW)

(73) Assignee: Delta Electronics Inc., Taoyuan County (TW)

( * ) Notice: Subject to any disclaimer, the term of this patent is extended or adjusted under 35 U.S.C. 154(b) by 742 days.

(21) Appl. No.: 10/695,776

(22) Filed: Oct. 30, 2003

(65) Prior Publication Data

US 2005/0019168 A1    Jan. 27, 2005

(30) Foreign Application Priority Data

Jul. 22, 2003    (TW) ............................... 92119947 A

(51) Int. Cl.
    *G05B 11/28*    (2006.01)
(52) U.S. Cl. .................. 318/599; 318/811; 318/461; 388/800; 388/804; 388/811; 388/907.5
(58) Field of Classification Search ............... 318/599, 318/811, 461; 388/800, 804, 811, 907.5
    See application file for complete search history.

(56) References Cited

U.S. PATENT DOCUMENTS 5,900,706 A * 5/1999 Hisa ............................ 318/437
6,400,113 B1 * 6/2002 Garcia et al. ................ 318/463
2002/0105293 A1 * 8/2002 Harlan ........................ 318/254
2003/0043606 A1 * 3/2003 Lipo et al. ..................... 363/41
2004/0105664 A1 * 6/2004 Ivankovic .................... 388/800
2004/0247449 A1 * 12/2004 Ma et al. ....................... 417/42

FOREIGN PATENT DOCUMENTS

| JP | 9-233881 A    | 9/1997 |
| JP | 2002-223581 A | 8/2002 |
| JP | 2003-164178 A | 6/2003 |

\* cited by examiner

*Primary Examiner*—Rina Duda
(74) *Attorney, Agent, or Firm*—Birch Stewart Kolasch & Birch, LLP

(57) ABSTRACT

A fan motor speed control circuit is disclosed. The circuit includes a digital/analog converting unit and a driving unit. The digital/analog converting unit takes charge of receiving a pulse width modulation (PWM) signal and converting it into a voltage signal. The driving unit is connected with the digital/analog converting unit in series for receiving the voltage signal, while the driving unit provides a first predetermined voltage level and a second predetermined voltage level as references. The fan motor is kept to run with a low constant rotation speed when the voltage signal level is higher than the first predetermined voltage level, with a full constant rotation speed when the voltage signal level is lower than the second predetermined voltage level, and with a variable rotation speed when the voltage signal level is lower than the first predetermined voltage level and higher than the second predetermined voltage level.

12 Claims, 6 Drawing Sheets

FAN MOTOR SPEED CONTROL CIRCUIT

This nonprovisional application claims priority under 35 U.S.C. § 119(a) on Patent Application No. 092119947 filed in TAIWAN on Jul. 22, 2003, the entire contents of which are hereby incorporated by reference.

BACKGROUND OF THE INVENTION

This invention relates to a rotation speed control circuit, and more particularly to a fan motor speed control circuit.

DESCRIPTION OF RELATED ART

With respect to fan motor speed control techniques, it is well known that people skilled in the art often uses a control circuit being composed of various type of transistors and driving integrated circuit (IC) chips, and an external driving signal for the control circuit, such as a pulse width modulation (PWM) signal, to control the rotation speed of a fan motor.

Referring to FIG. 1A, in a conventional fan motor rotation speed control technique, an external pulse width modulation (PWM) signal 3 is mainly used to drive a bipolar transistor 2 and a drive IC 5, in order to control the terminal voltage of a stator coil 1 representing the fan motor (not shown). In addition, a Hall element 4 is used to detect the magnetic polarity of a rotor of a fan motor, in order that the current direction of the stator coil 1 matches with the magnetic pole position of the rotor. Referring to FIG. 1B, in another conventional fan motor speed control technique, an external voltage $V_A$ and an external pulse width modulation (PWM) signal 3 are used to drive two bipolar transistors 12 and 13, and a drive IC 14.

In the above-mentioned conventional techniques, however, when the frequency of the pulse width modulation (PWM) signal is low, the switch between ON and OFF state of the transistors 2, 12, 13 directly driven by the pulse width modulation (PWM) signal often leads to vibrations during the operation of the fan motor, and thus produces undesired noises easily.

SUMMARY OF THE INVENTION

A conventional fan motor rotation speed control circuit cannot avoid the noise problem caused by the ON/OFF switch of the fan motor when the frequency of a pulse width modulation (PWM) signal is low.

In order to solve this problem, this invention discloses a fan motor speed control circuit that reduces the above-mentioned noises and smoothens the speed change of the fan motor.

One object of this invention is to provide a fan motor speed control circuit to control the rotation speed of a fan motor by means of a digital/analog converting processing and a low to high frequency signals switching processing.

According to one embodiment of the invention, the fan motor speed control circuit comprises a digital/analog converting unit and a driving unit. In this embodiment, the digital/analog converting unit takes charge of receiving a pulse width modulation (PWM) signal and converting it into a voltage signal, while the driving unit is connected with the digital/analog converting unit in series to receive the voltage signal and provides a predetermined high voltage and a predetermined low voltage as references.

When the above-mentioned voltage signal level is higher than the above-mentioned predetermined high voltage level, the fan motor is kept to run with a low constant rotation speed. When the voltage signal level is lower than the predetermined high voltage level but higher than the predetermined low voltage level, the fan motor is allowed to have a variable rotation speed. When the voltage signal level is lower than the predetermined low voltage level, the fan motor is kept to run with a high constant rotation speed.

The advantage of this invention is to reduce the vibration degree and noise problem occurred in a conventional fan motor control circuit directly driven by an external low frequency PWM signal.

DETAILED DESCRIPTION OF THE PREFERRED EMBODIMENT

Figure 1A:
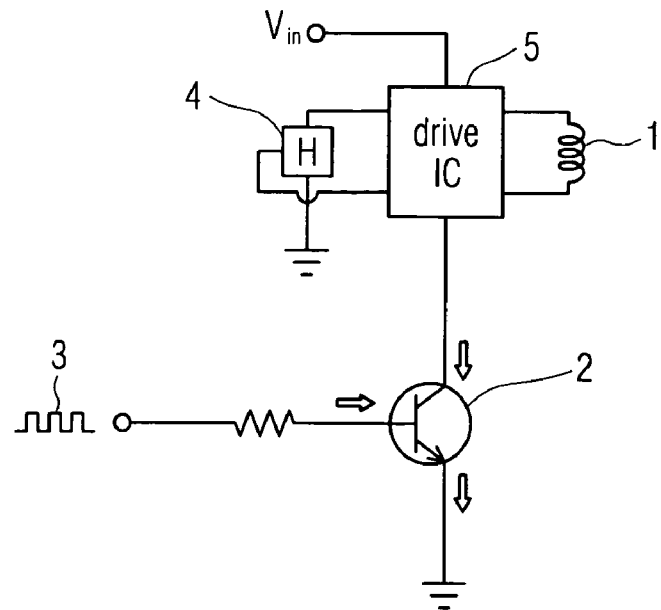
FIG. 1A is a schematic diagram illustrating a conventional fan motor speed control circuit.
Figure 1B:
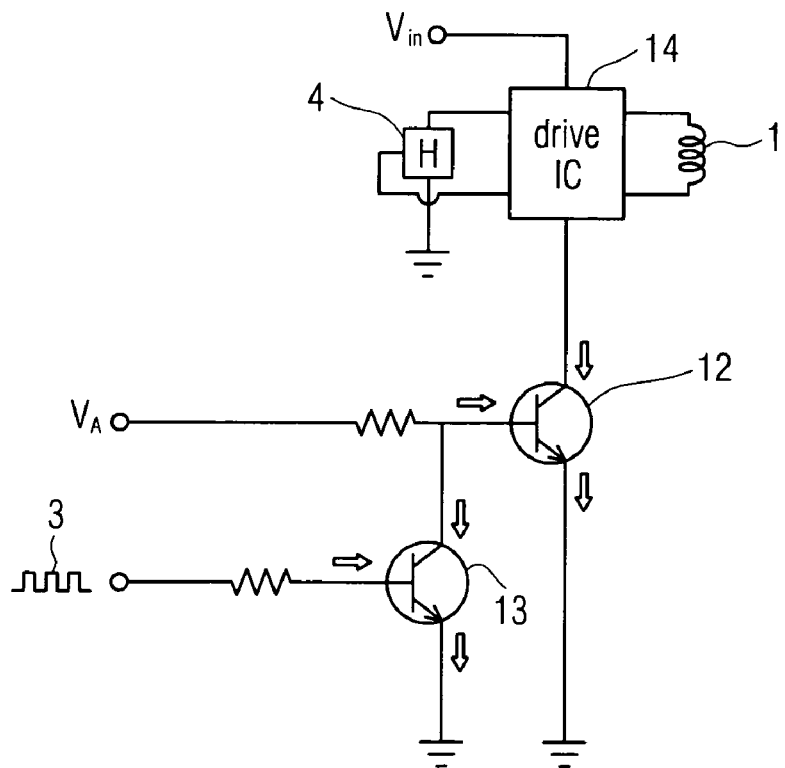
FIG. 1B is a schematic diagram illustrating another conventional fan motor speed control circuit.
Figure 2:
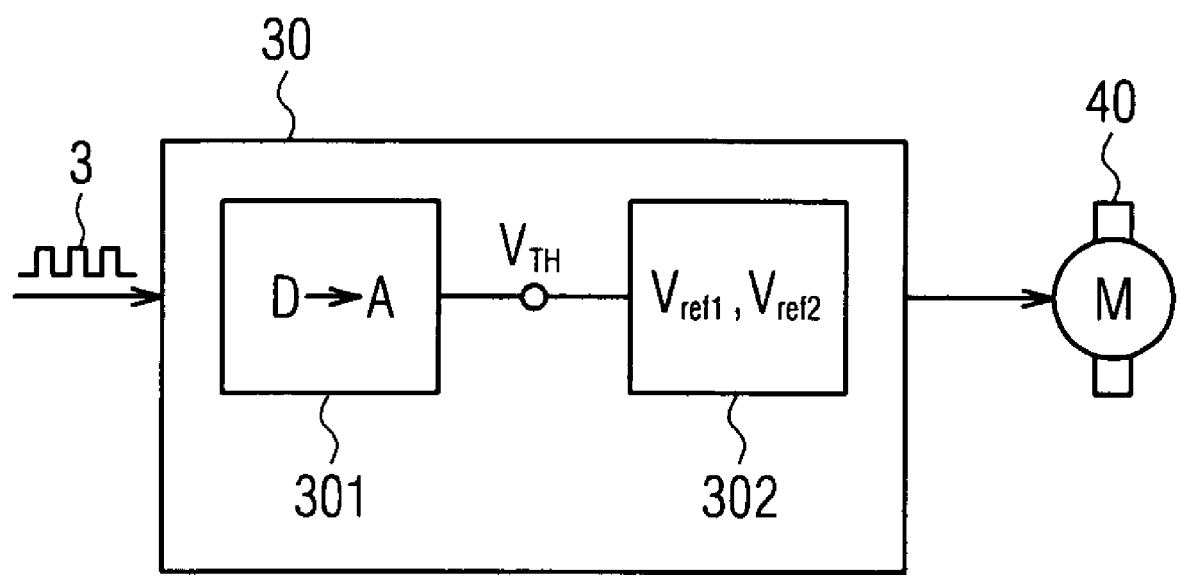
FIG. 2 is a block diagram showing the basic structure of a fan motor speed control circuit in accordance with the present invention.

Referring to FIG. 2, a fan motor speed control circuit 30 in accordance with the invention comprises a digital/analog converting unit 301 and a driving unit 302. The digital/analog converting unit 301 is used for converting an inputted PWM digital signal 3 into an analog signal such as a voltage signal. The driving unit 302 takes the analog signal and compares it with two predetermined voltages $V_{ref1}$ and $V_{ref2}$ set by the driving unit. After that, a digital signal representing the comparison result is used to control the rotation speed of the fan motor 40.

Figure 3A:
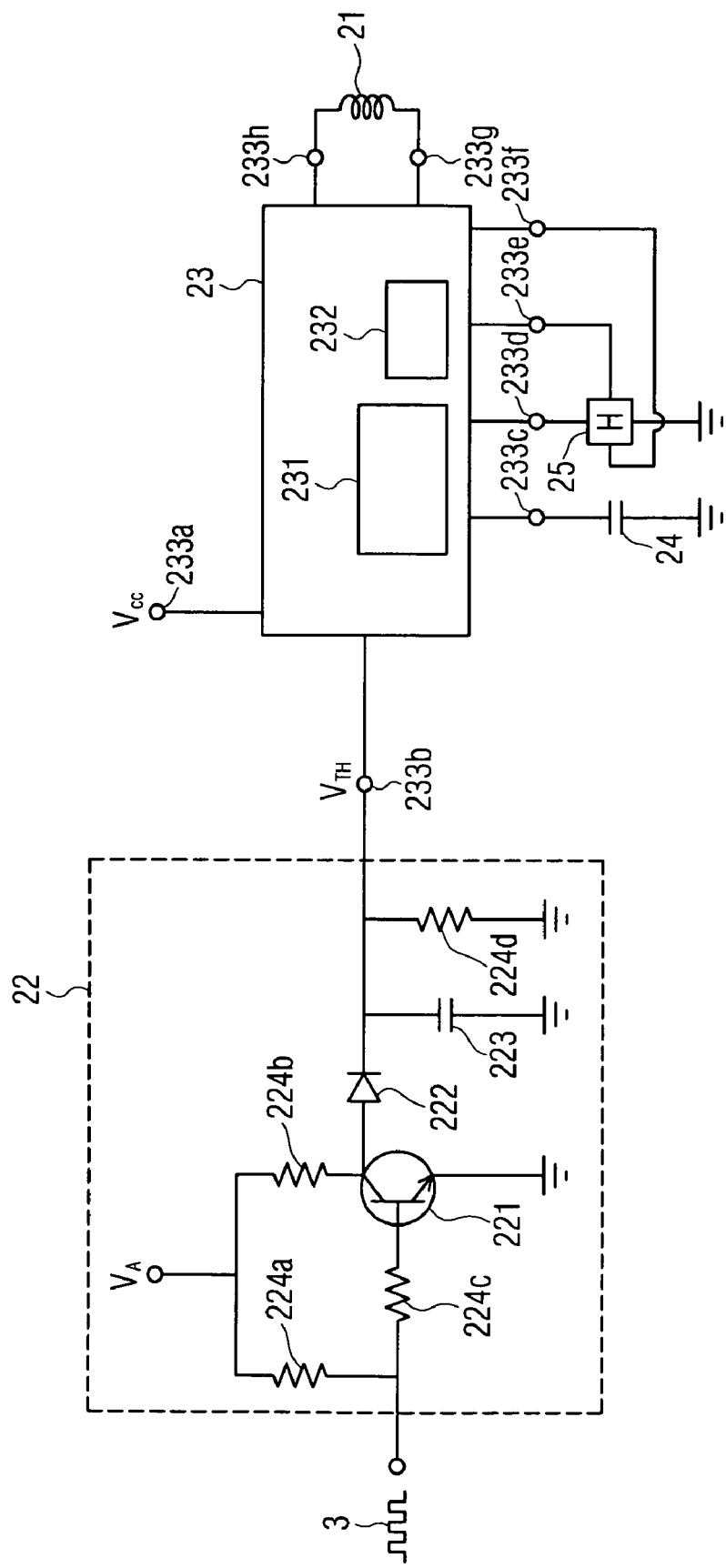
FIG. 3A is a schematic diagram of a fan motor speed control circuit in accordance with one embodiment of the invention.

The fan motor speed control circuit according to one embodiment of the invention is shown in FIG. 3A. In this embodiment, a digital/analog converting circuit 22 is employed as a digital/analog converting unit, and a drive IC 23 is employed as a driving unit. In this embodiment, the digital/analog converting circuit 22 is mainly composed of a transistor 221, a diode 222, a capacitor 223, and a plurality of resistors 224a~224d. On the other hand, the drive IC 23 comprises at least an oscillating element 231, a control element 232 and a plurality of terminals 233a~233h. These terminals are electrically coupled with or connected to a voltage source $V_{cc}$, an external capacitor 24, a Hall element 25 and the stator coil 21 of the fan motor, respectively. Moreover, the oscillating element 231 is activated by an external capacitor 24 and has a high frequency outputted digital signal, such as 25 KHz. Therefore, the drive IC 23 in this embodiment is different from the conventional drive IC 5 and drive IC 14.

Figure 3B:
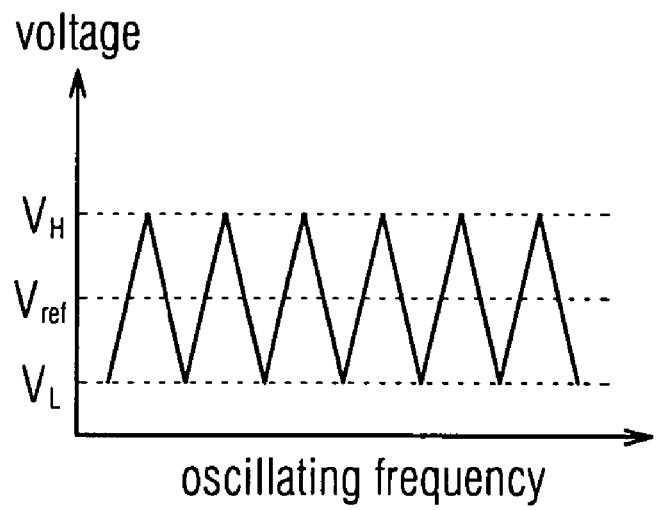
FIG. 3B is a graph showing the relations between the frequency and the voltage of an oscillating element of a fan motor speed control circuit according to one embodiment of the invention.
Figure 3C:
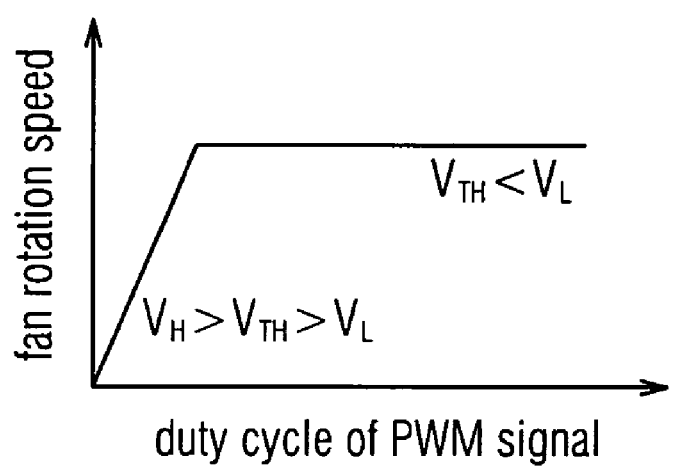
FIG. 3C is a graph showing the relations between the fan motor rotation speed and the duty cycle of a PWM signal for the fan motor according to one embodiment of the invention.

Hereinafter, the working principle of the fan motor speed control circuit according to this embodiment is described. First, an input pulse width modulation signal 3 is converted into an analog voltage signal by the digital/analog converting circuit 22, and received by the drive IC 23. The drive IC 23 takes the level $V_{TH}$ of the analog voltage signal as a threshold voltage. After that, the control element 232 compares the threshold voltage level $V_{TH}$ with the upper voltage level $V_H$ and the lower voltage level $V_L$ of a high frequency signal (as shown in FIG. 3B) output by the oscillating element 231. When $V_{TH}$ is higher than $V_H$, the control element 232 controls the terminal voltage of the stator coil 21 to make the fan motor have a zero rotation speed. When $V_{TH}$ is lower than $V_H$ but is higher than $V_L$, the control element 232 controls the two terminal voltages of the stator coil 21 to make the fan have a variable rotation speed. When $V_{TH}$ is lower than $V_L$, the fan motor has a high constant rotation speed. In this embodiment, the relation between the duty cycle of a PWM signal 3 and the rotation speed of a fan motor is shown in FIG. 3C. In this diagram, the left side and the right side of the speed changing point respectively shows the cases of $V_H > V_{TH} > V_L$ and $V_{TH} < V_L$ as described above.

Figure 4A:
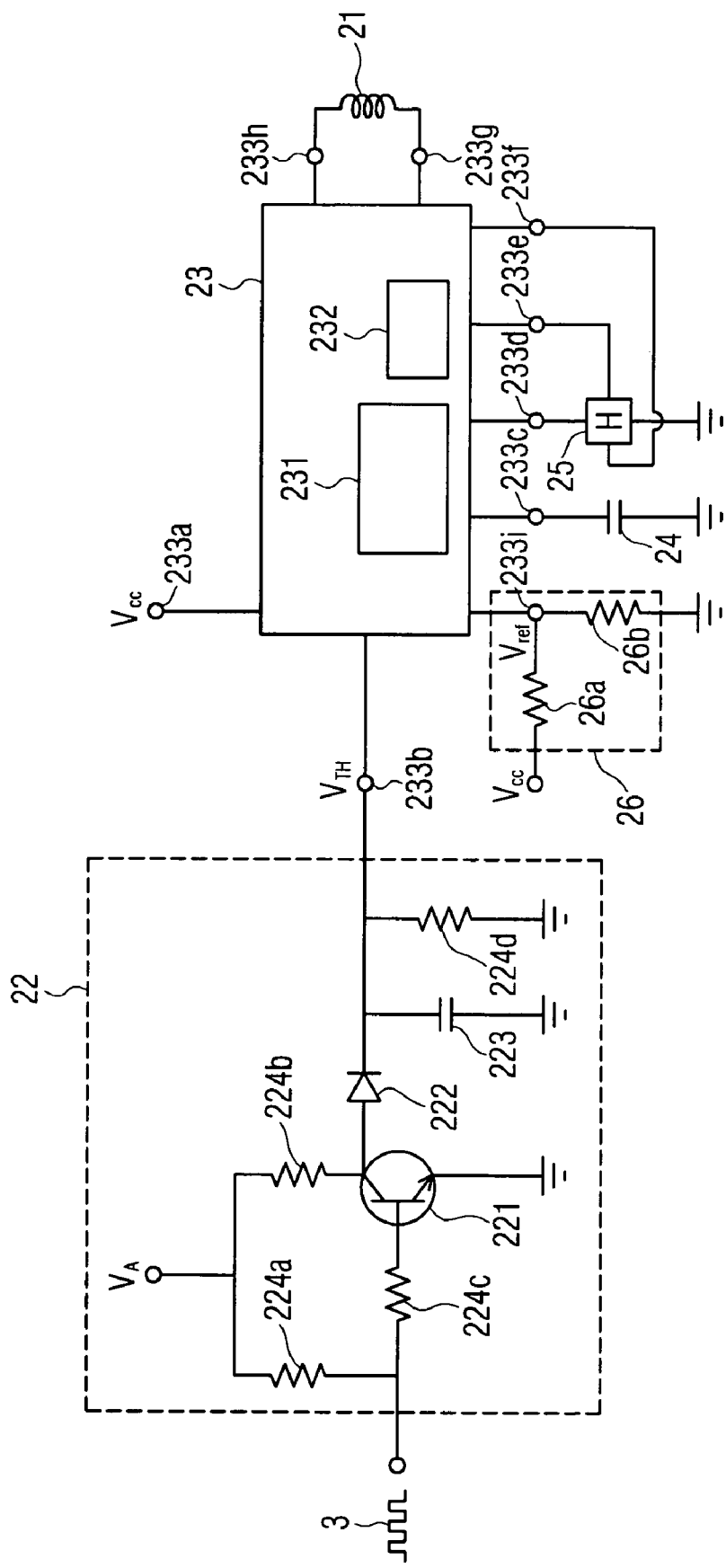
FIG. 4A is a schematic diagram of a fan motor speed control circuit according to another embodiment of the invention.

A fan motor speed control circuit according to another embodiment of the invention is shown in FIG. 4A. In this embodiment, a digital/analog converting circuit 22 is employed as a digital/analog converting unit, and a drive IC 23 is employed as a driving unit. In this embodiment, the digital/analog converting circuit 22 comprises the same elements as those described earlier. On the other hand, the drive IC 23 further comprises a terminal 233i besides an oscillating element 231, a control element 232 and a plurality of terminals 233a~233h. These terminals are electrically coupled with or connected to a voltage source $V_{cc}$, an external capacitor 24, a Hall element 25, the stator coil 21 of the fan motor, and a voltage-dividing circuit 26, respectively. This voltage-dividing circuit 26 is composed of resistors 26a and 26b, the objective of which is to provide a reference voltage $V_{ref}$ taken from the voltage level of the resistor 26b by the voltage-dividing circuit 26.

Noteworthily, the oscillating element 231 is activated by an external capacitor 24 and has an output digital signal of high frequency, such as 25 KHz. This is how the drive IC 23 in this embodiment differs from the conventional drive IC 5 and drive IC 14.

The working principle of the fan motor speed control circuit of this embodiment is similar to those described above. The same part will not be described again. The differential part is that, after the drive IC 23 obtained the level $V_{TH}$ of a threshold voltage, the control element 232 compares the threshold voltage level $V_{TH}$ with a low voltage level $V_L$ of a high frequency signal output by the oscillating element 231 (as shown in FIG. 3B), and a reference voltage $V_{ref}$. Herein, the reference voltage $V_{ref}$ is lower than the high voltage level $V_H$ of the high frequency signal, which is shown in FIG. 3B.

Figure 4B:
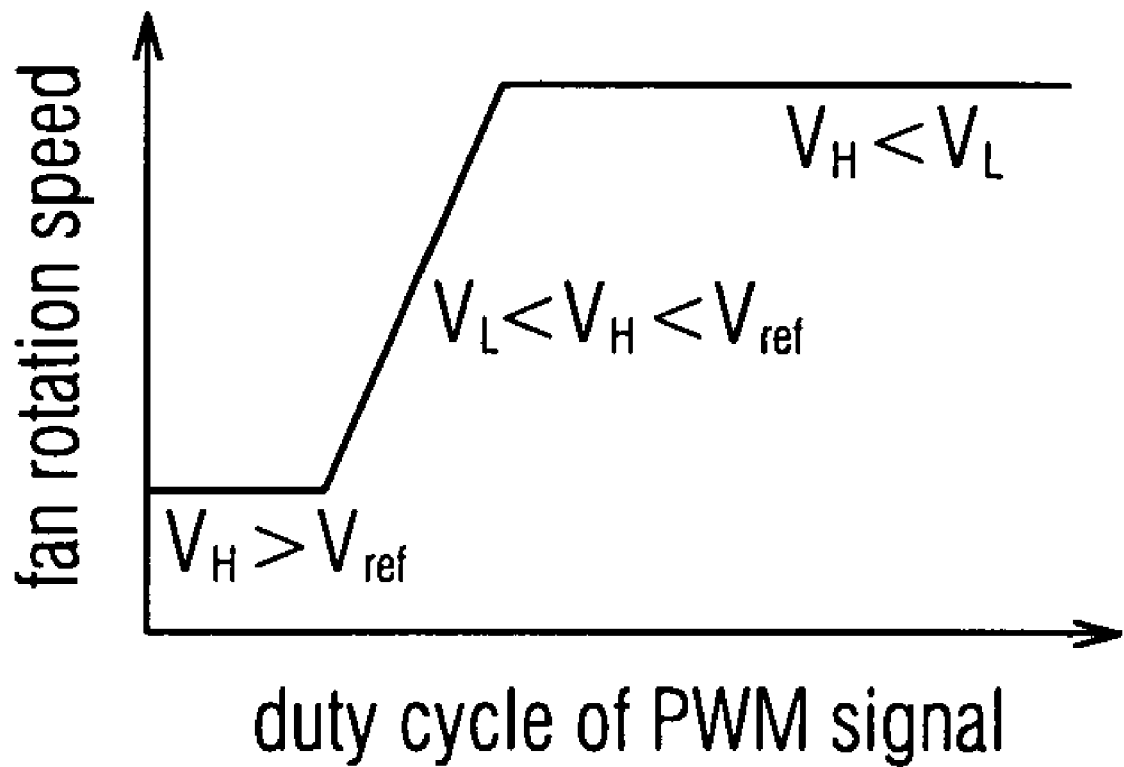
FIG. 4B is a graph showing the relations between the fan motor rotation speed and the duty cycle of a PWM signal for the fan motor according to another embodiment of the invention.

When $V_{TH}$ is higher than $V_{ref}$, the control element 232 controls the terminal voltage of the stator coil 21 to make the fan motor have a low constant rotation speed. When $V_{TH}$ is lower than $V_{ref}$ but higher than $V_L$, the control element 232 controls the terminal voltage of the stator coil 21 to make the fan motor have a variable rotation speed. Otherwise, when $V_{TH}$ is lower than $V_L$, the fan motor keeps a high constant rotation speed. In this embodiment, the relation between the duty cycle of a PWM signal 3 and the rotation speed of a fan motor is shown in FIG. 4B.

In summary, this invention has been described in details with the above embodiments and variations. Any person skilled in the art should understand that all embodiments are described herein for exemplary purposes rather for restriction. That is, any modification or changes to the fan motor speed control circuit as described above without departing from the spirit and scope of the invention should be embraced in the appended claim.

What is claimed is:

1. A fan motor speed control circuit, comprising:
    a digital/analog converting unit for receiving a pulse width modulation (PWM) signal, and transforming the PWM signal to a voltage signal; and
    a driving unit connected with the digital/analog converting unit in series for receiving the voltage signal, and providing a first predetermined voltage and a second predetermined voltage among which the first predetermined voltage is higher than the second predetermined voltage;
    wherein, the fan motor has a low constant rotation speed when the level of the voltage signal is higher than the first predetermined voltage level; the fan motor has a variable rotation speed when the level of the voltage signal is lower than the first predetermined voltage level but higher than the second predetermined voltage level; the fan motor has a high constant rotation speed when the level of the voltage signal is lower than the second predetermined voltage level.

2. The fan motor speed control circuit as claimed in claim 1, wherein the low constant rotation speed is set to be zero.

3. The fan motor speed control circuit as claimed in claim 1, wherein the digital/analog converting unit comprises a transistor, a diode, a capacitor and a plurality of resistors.

4. The fan motor speed control circuit as claimed in claim 1, wherein the driving circuit comprises a Hall element and an oscillating circuit.

5. The fan motor speed control circuit as claimed in claim 4, wherein the first predetermined voltage and the second predetermined voltage are provided by the oscillating circuit.

6. The fan motor speed control circuit as claimed in claim 4, wherein the driving circuit further comprises a voltage-dividing circuit, and the first predetermined voltage level is determined by the voltage-dividing circuit, and the low constant rotation speed is not zero.

7. The fan motor speed control circuit as claimed in claim 1, wherein the driving unit is integrated into an IC chip.

8. A fan motor speed control circuit driven by a PWM signal, the fan motor speed control circuit comprising:
    a digital/analog converting circuit for receiving the PWM signal, and converting the PWM signal into a voltage signal; and
    a drive IC having a control element, an oscillating element and a plurality number of terminals; the oscillating element outputs a digital signal; the terminals are coupled with the digital/analog converting circuit, a Hall element, the stator coil of a fan motor, and an input voltage source respectively;
    wherein, the control element receives the voltage signal; the fan motor has a zero rotation speed when the voltage signal level is higher than the high voltage level of the digital signal; the fan motor has a variable rotation speed when the voltage signal level is lower than the high voltage level of the digital signal but higher than the low voltage level of the digital signal; the fan motor has a high constant rotation speed when the voltage signal level is lower than the low voltage level of the digital signal.

9. The fan motor speed control circuit as claimed in claim 8, wherein the digital/analog converting circuit comprises a transistor, a diode, a capacitor and a plurality of resistors.

10. A fan motor speed control circuit driven by a PWM signal, comprising:

a digital/analog converting circuit for receiving the PWM signal and converting the PWM signal into a voltage signal;

a voltage-dividing circuit; and a drive IC having a control element, an oscillating element and a plurality number of terminals; the oscillating element outputs a digital signal; the terminals are coupled with the digital/analog converting circuit, the voltage-dividing circuit, a Hall element, the stator coil of a fan motor, and an input voltage source, respectively;

wherein, the control element receives the voltage signal and take a partial voltage level of the voltage-dividing circuit; the fan motor has a low constant rotation speed when the voltage signal level is higher than the partial voltage level of the voltage-dividing circuit; the fan motor has a variable rotation speed when the voltage signal level is lower than the partial voltage level of the voltage-dividing circuit but higher than the low voltage level of the digital signal; the fan motor has a high constant rotation speed when the voltage signal level is lower than the low voltage level of the digital signal.

11. The fan motor speed control circuit as claimed in claim 10, wherein the digital/analog converting circuit comprises a transistor, a diode, a capacitor and a plurality of resistors.

12. The fan motor speed control circuit as claimed in claim 10, wherein the voltage-dividing circuit comprises two resistors.

* * * * *